(12) United States Patent  
Miller et al.

(10) Patent No.: US 8,718,935 B2  
(45) Date of Patent: May 6, 2014

(54) NAVIGATIONAL SYSTEM INITIALIZATION SYSTEM, PROCESS, AND ARRANGEMENT

(75) Inventors: Paul A. Miller, Cranberry Township, PA (US); Thomas Trautzsch, Cranberry Township, PA (US)

(73) Assignee: MSA Technology, LLC, Cranberry Township, PA (US)

(*) Notice: Subject to any disclaimer, the term of this patent is extended or adjusted under 35 U.S.C. 154(b) by 716 days.

(21) Appl. No.: 12/909,982

(22) Filed: Oct. 22, 2010

(65) Prior Publication Data

US 2011/0098921 A1  Apr. 28, 2011

Related U.S. Application Data

(60) Provisional application No. 61/254,379, filed on Oct. 23, 2009.

(51) Int. Cl.
G01C 21/12 (2006.01)
G08B 1/08 (2006.01)
G01C 21/00 (2006.01)
G08G 1/123 (2006.01)

(52) U.S. Cl.
USPC .......... 701/469; 340/539.13; 340/995.19; 701/495

(58) Field of Classification Search
USPC ......... 701/207, 220, 500; 340/539.19, 995.19
See application file for complete search history.

(56) References Cited

U.S. PATENT DOCUMENTS

| 5,583,776 | A | | 12/1996 | Levi et al. |
| 5,671,160 | A | * | 9/1997 | Julian ........................... 702/94 |
| 5,724,265 | A | | 3/1998 | Hutchings |
| 5,899,963 | A | | 5/1999 | Hutchings |
| 6,014,608 | A | * | 1/2000 | Seo ............................... 701/468 |
| 6,122,960 | A | | 9/2000 | Hutchings et al. |
| 6,305,221 | B1 | | 10/2001 | Hutchings |
| 8,185,101 | B1 | | 5/2012 | Wiseman et al. |
| 2004/0021569 | A1 | | 2/2004 | Lepkofker et al. |
| 2005/0011720 | A1 | | 1/2005 | Adair et al. |
| 2005/0227650 | A1 | | 10/2005 | Williams |

(Continued)

FOREIGN PATENT DOCUMENTS

EP   1847807 A1   10/2007
EP   2040036 A2   3/2009

OTHER PUBLICATIONS

Foxlin, Pedestrian Tracking with Shoe-Mounted Inertial Sensors, IEEE Computer Society, Nov.-Dec. 2005, pp. 38-46.

(Continued)

*Primary Examiner* — Thomas Black
*Assistant Examiner* — Tyler Paige
(74) *Attorney, Agent, or Firm* — The Webb Law Firm

(57) ABSTRACT

An initialization system for a personal navigation system associated with a user, including: a first reference point arrangement configured for communication with the personal navigation system of the user and to facilitate the generation of a first user data set including horizontal position and azimuth angle $(x_1, y_1, \theta_1)$; a second reference point arrangement configured for communication with the personal navigation system of the user and to facilitate the generation of a second user data set including horizontal position and azimuth angle $(x_2, y_2, \theta_2)$; and at least one control device configured to determine a common coordinate system based at least in part upon the first user data set and the second user data set. An initialization process and arrangement are also disclosed.

19 Claims, 10 Drawing Sheets

(56) References Cited

U.S. PATENT DOCUMENTS

| | | | |
|---|---|---|---|
| 2006/0155584 | A1 | 7/2006 | Aggarwal |
| 2008/0077326 | A1* | 3/2008 | Funk et al. .................. 701/220 |
| 2008/0129599 | A1* | 6/2008 | Thomas et al. ............. 342/458 |
| 2009/0221298 | A1 | 9/2009 | Hanner |
| 2009/0254276 | A1 | 10/2009 | Faulkner et al. |
| 2010/0131192 | A1* | 5/2010 | Clark ........................ 701/208 |
| 2011/0054836 | A1 | 3/2011 | Foxlin |
| 2011/0098921 | A1 | 4/2011 | Miller et al. |
| 2012/0274447 | A1 | 11/2012 | Hess |

OTHER PUBLICATIONS

Ali et al., Alignment of Strapdown Inertial Navigation System: A Literture Survey Spanned over the Last 14 years, pp. 1-12.

Gebre-Egziabher et al., A Gyro-Free Quaternion-Based Attitude Determination System Suitable for Implementation Using Low Cost Sensors, Position Location and Navigation Symposium IEEE, 2000, pp. 185-192.

Alonso et al., Centering and Observability in Attitude-Independent Magnetometer-Bias Determination, The Journal of the Astronautical Sciences, Apr.-Jun. 2003, pp. 133-141, vol. 51, No. 2.

Alonso et al., Twostep: A Fast Robust Algorithm for Attitude-Independent Magnetometer-Bias Determination, The Journal of the Astronautical Sciences, Oct.-Dec. 2002, pp. 433-451, vol. 50, No. 4.

Vasconcelos et al., A Geometric Approach to Strapdown Magnetometer Calibration in Sensor Frame, 2nd IFAC Workshop Navigation, Guidance, and Control of Underwater Vehicles, 2008, vol. 2, Part 1, Lakeside Hotel, Ireland.

Markley, Fast Quaternion Attitude Estimation from Two Vector Measurements, Journal of Guidance, Control, and Dynamics, 2002, pp. 411-414, vol. 25, No. 2.

Crassidis et al., Real-Time Attitude-Independent Three-Axis Magnetometer Calibration, Journal of Guidance, Control, and Dynamics, 2005, pp. 115-120, vol. 28, No. 1.

Alonso et al., Attitude-Independent Magnetometer-Bias Determination: A Survey, The Journal of the Astronautical Sciences, Oct.-Dec. 2002, pp. 453-475, vol. 50, No. 4.

Thomasson et al., Understanding the Fresnel Zone, Oct. 1996, 2 pages.

Woodman, An Introduction to Inertial Navigation, Technical Report No. 696, University of Cambridge Computer Laboratory, Aug. 2007, pp. 1-37.

Motorola's Canopy Wireless Broadband Platform: The Secure, Flexible, Reliable Wireless Solution for Building or Extending Your Broadband Network, Motorola, 2006, available at http://www.ptsupply.com/pdf/motorola_canopy_CanopyOverview-US.pdf.

Motorola Canopy Wireless Broadband 900 MHz Modules: Providing Reliable Broadband Service to Remote Customers with Canopy System 900 MHz Modules, Motorola, 2004, available at http://www.motorola.com/web/Business/_Documents/static%20files/900%20Mhz%20Module.

Motorola Canopy Wireless Broadband 2.4 GHz System, Motorola, 2003, available at http://www.motorola.com/web/Business/_Documents/static%20files/2.4%20GHz%20Canopy%20System.pdf?pLibItem=1&localeId=33.

Lehr et al., Wireless Internet Access: 3g vs. WiFi?, Telecommunications Policy, 2003, pp. 351-370, vol. 27.

Faulkner et al., GPS-denied Pedestrian Tracking in Indoor Environments Using an IMU and Magnetic Compass, Jun. 20, 2011, pp. 1-7.

* cited by examiner

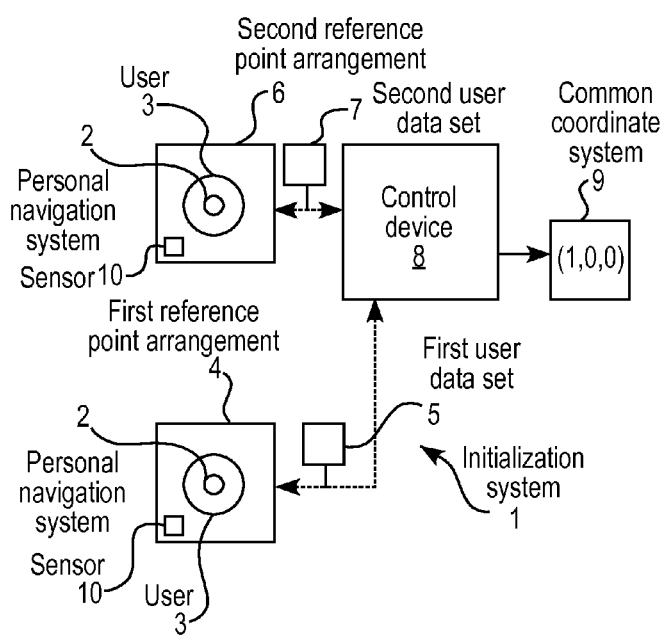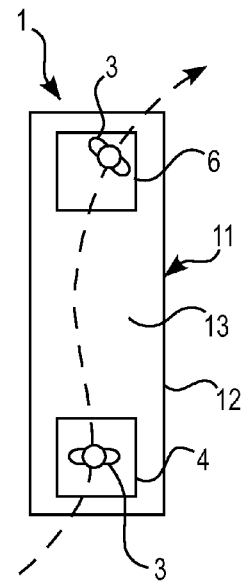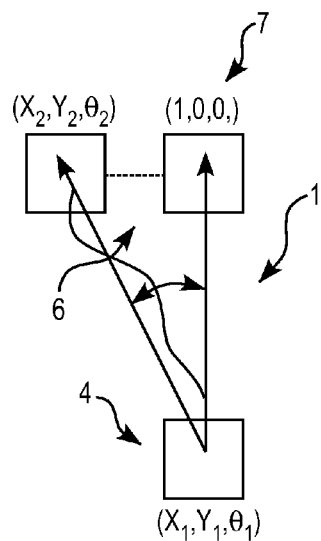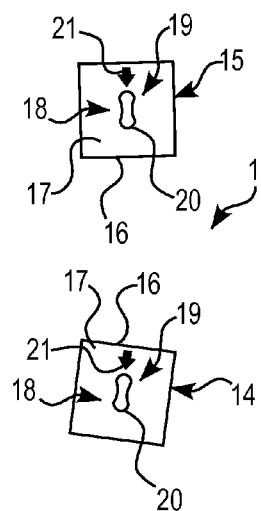
FIG. 8
FIG. 10
FIG. 9
FIG. 11

NAVIGATIONAL SYSTEM INITIALIZATION SYSTEM, PROCESS, AND ARRANGEMENT

CROSS REFERENCE TO RELATED APPLICATIONS

This application claims the benefit of priority from of U.S. Provisional Patent Application Ser. No. 61/254,379, filed Oct. 23, 2009, which is incorporated herein by reference in its entirety.

BACKGROUND OF THE INVENTION

1. Field of the Invention

The present invention relates generally to the field of navigation and/or position tracking, including a personal navigation system and, in particular, to a navigational system initialization and deployment system, process, and arrangement.

2. Description of the Related Art

The present invention relates generally to devices, systems, and methods of determining the location of mobile personnel and, particularly, to devices, systems, and methods of determining the location of personnel working under hazardous conditions outdoors and/or within one or more structures.

Personal navigation and tracking systems are being developed today for use in any number of applications. In one example, personal navigation and tracking systems may be useful in military applications for tracking and directing the movements of military personnel during military practice maneuvers and/or military battlefield environments. In another example, personal navigation and tracking systems may be useful in field service applications for tracking field service personnel and/or a fleet of vehicles that have been dispatched into the field. In yet another example, personal navigation and tracking systems may be useful in first responder applications for tracking and directing the positions of, for example, law enforcement personnel at the scene of a crime or accident, firefighters at the scene of an accident or fire, and/or emergency medical services (EMS) personnel at the scene of an accident.

Firefighters, first responders, and military personnel work in the world's most dangerous occupations in some of the world's most hazardous environments. Firefighters can easily become disoriented or separated since most firefighting is done in zero visibility as a result of smoke. First responders constantly place themselves in danger, which sometimes results in becoming trapped or disabled. Military personnel face dangerous conditions on a daily basis, and knowing where each soldier is located, whether performing routine tasks or under hostile fire, would be extremely valuable to the commanding officer. In all cases, there are examples where fatalities might have been prevented or injuries lessened in severity with a location system that provides location information about a person in need of assistance to other personnel to find that person relatively quickly.

In cases in which personnel are outdoors, global positioning system (GPS) devices and solutions can, for example, be used to roughly locate such personnel. However, multipath propagation problems lead to poor signals and inaccurate results with GPS devices when used within a structure. Moreover, without significant processing, GPS devices are typically accurate to approximately ±3 meters. Although such inaccuracy can be acceptable for locating personnel and objects outdoors, an inaccuracy of 3 meters within a structure can, for example, result in sending a rescue team to a wrong floor within the structure and thus squandering precious time in a rescue mission. Like GPS devices, some localization devices which use, for example, radio frequency energy, ultrasound energy and/or infrared energy, can suffer from multipath propagation problems, leading to substantial inaccuracy when used within structures.

With respect to first responder applications, firefighters have lost their lives because of the lack of effective indoor navigation and tracking systems. As a result, there is particular interest in developing effective navigation and tracking systems for indoor use. Traditional systems for navigating indoors, such as within a building, are generally costly or ineffective. For example, the installation and operating costs associated with an installed base of radio frequency markers within a building are substantial barriers not readily overcome. In addition, poor reception of radio frequency navigation signals within a building, such as that used by satellite-based navigation systems, precludes widespread acceptance.

More specifically, indoor environments pose particular challenges with respect to implementing navigation and tracking systems. For example, signal transmission in indoor environments may be characterized by the presence of reflections, attenuation, low signal to noise ratio, and signal multipath effects; all of which may decrease tracking accuracy and may prevent signal acquisition all together. Further, multiple story buildings pose additional obstacles for tracking, as they require three-dimensional positioning.

One type of navigating system is an inertial navigation system (INS), which is a navigation aid that uses a computer and motion sensors to continuously calculate via dead reckoning the position, orientation, and velocity of a moving object without the need for external references. Inertial navigation systems are used in many different moving objects, including vehicles, aircraft, submarines, spacecraft, and guided missiles. However, their components size, cost, and complexity places constraints on the environments in which INS is practical for use.

An INS includes at least a computer and a platform or module containing accelerometers, gyroscopes, or other motion-sensing devices. A typical INS is initially provided with its position and velocity from another source (a human operator, a GPS satellite receiver, etc.), and thereafter computes its own updated position and velocity by integrating information received from the motion sensors. The advantage of an INS is that it requires no external references in order to determine its position, orientation, or velocity once it has been initialized.

The initialization and deployment process represents one key component in using an INS, such as a boot-mounted INS-based personal navigation system, wherein multiple users are being tracked in a given environment. For example, if multiple responders will be entering a building or structure, they must somehow be coordinated relative to each other in order to effectively track their position.

In view of the shortcomings of the aforementioned navigation and tracking systems, a need exists for new approaches to personal navigation and tracking. In particular, a need exists for a practical and cost-effective personal navigation and tracking system that is highly accurate and reliable in any environment and that is suitable for use in any application, such as, but not limited to, military applications and first responder applications. It is further desirable to develop improved devices, systems, and methods of determining the location of mobile personnel that reduce the severity of or eliminate the above-described and other problems with current location devices, systems and methods. It is additionally desirable to develop a navigational system initialization system and arrangement for determining a common frame of reference (or coordinate system) between multiple users.

SUMMARY OF THE INVENTION

Generally, the present invention provides a navigational system initialization system, process, and arrangement that overcomes some or all of the drawbacks and deficiencies associated with existing navigation systems. In one embodiment, the present invention preferably provides a navigational system initialization system, process, and arrangement that provide an initialization process for an INS-based personal navigational system. In another embodiment, the present invention preferably provides a navigational system initialization system, process, and arrangement that determine a common frame of reference and/or coordinate system between multiple users. In a further embodiment, the present invention preferably provides a navigational system initialization system, process, and arrangement that determine a unique user-based azimuth and position for establishing a common heading and/or common coordinate system for use in connection with all users in an environment.

In one preferred and non-limiting embodiment, the present invention provides an initialization system for a personal navigation system associated with a user. The system includes: an arbitrary first reference point arrangement configured for communication with the personal navigation system of the user and to facilitate the generation of a first user data set including horizontal position and azimuth angle ($x_1$, $y_1$, $\theta_1$); an arbitrary second reference point arrangement configured for communication with the personal navigation system of the user and to facilitate the generation of a second user data set including horizontal position and azimuth angle ($x_2$, $y_2$, $\theta_2$); and at least one control device configured to determine a common coordinate system based at least in part upon the first user data set and the second user data set.

In another preferred and non-limiting embodiment, the present invention provides an initialization system for a personal navigation system mounted on a boot of a user. The system includes: an arbitrary first reference point arrangement in the form of a first portable mat for placement on a surface and having an upper surface, wherein, upon contact by the boot of the user on the upper surface, the first reference point arrangement is configured to communicate with the personal navigation system of the user, and facilitate the generation of a first user data set including horizontal position and azimuth angle ($x_1$, $y_1$, $\theta_1$); an arbitrary second reference point arrangement in the form of a second portable mat for placement on a ground surface and having an upper surface, wherein, upon contact by the boot of the user on the upper surface, the second reference point arrangement is configured to communicate with the personal navigation system of the user, and facilitate the generation of a second user data set including horizontal position and azimuth angle ($x_2$, $y_2$, $\theta_2$); and at least one control device configured to determine a common coordinate system based at least in part upon the first user data set and the second user data set.

In a still further preferred and non-limiting embodiment, the present invention provides an initialization process for a personal navigation system associated with a user. The process includes: upon contact by the user with an arbitrary first reference point arrangement, communicating with the personal navigation system of the user and generating a first user data set including horizontal position and azimuth angle ($x_1$, $y_1$, $\theta_1$); upon contact by the user with an arbitrary second reference point arrangement, communicating with the personal navigation system of the user and generating a second user data set including horizontal position and azimuth angle ($x_2$, $y_2$, $\theta_2$); and determining a common coordinate system based at least in part upon the first user data set and the second user data set.

In a still further preferred and non-limiting embodiment, the first reference point arrangement and the second reference point arrangement are formed using the necessary equipment and components for communicating and/or facilitating the generation of these data sets. Accordingly, either or both of the first reference point arrangement and the second reference point arrangement are at least one radio frequency arrangement, at least one magnetic field arrangement, at least one pressure sensing arrangement, at least one acoustic arrangement, and/or at least one electrical arrangement.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural forms unless the context clearly dictates otherwise.

BRIEF DESCRIPTION OF THE DRAWINGS

FIG. 8 is a schematic view of a navigational system initialization system and arrangement according to the principles of the present invention;

FIG. 9 is a diagram of a determination made in accordance with a navigational system initialization process according to the principles of the present invention;

FIG. 10 is a schematic view of one embodiment of a navigational system initialization system and arrangement according to the principles of the present invention;

FIG. 11 is a schematic view of another embodiment of a navigational system initialization system and arrangement according to the principles of the present invention;

DETAILED DESCRIPTION OF THE PREFERRED EMBODIMENTS

Figure 1:
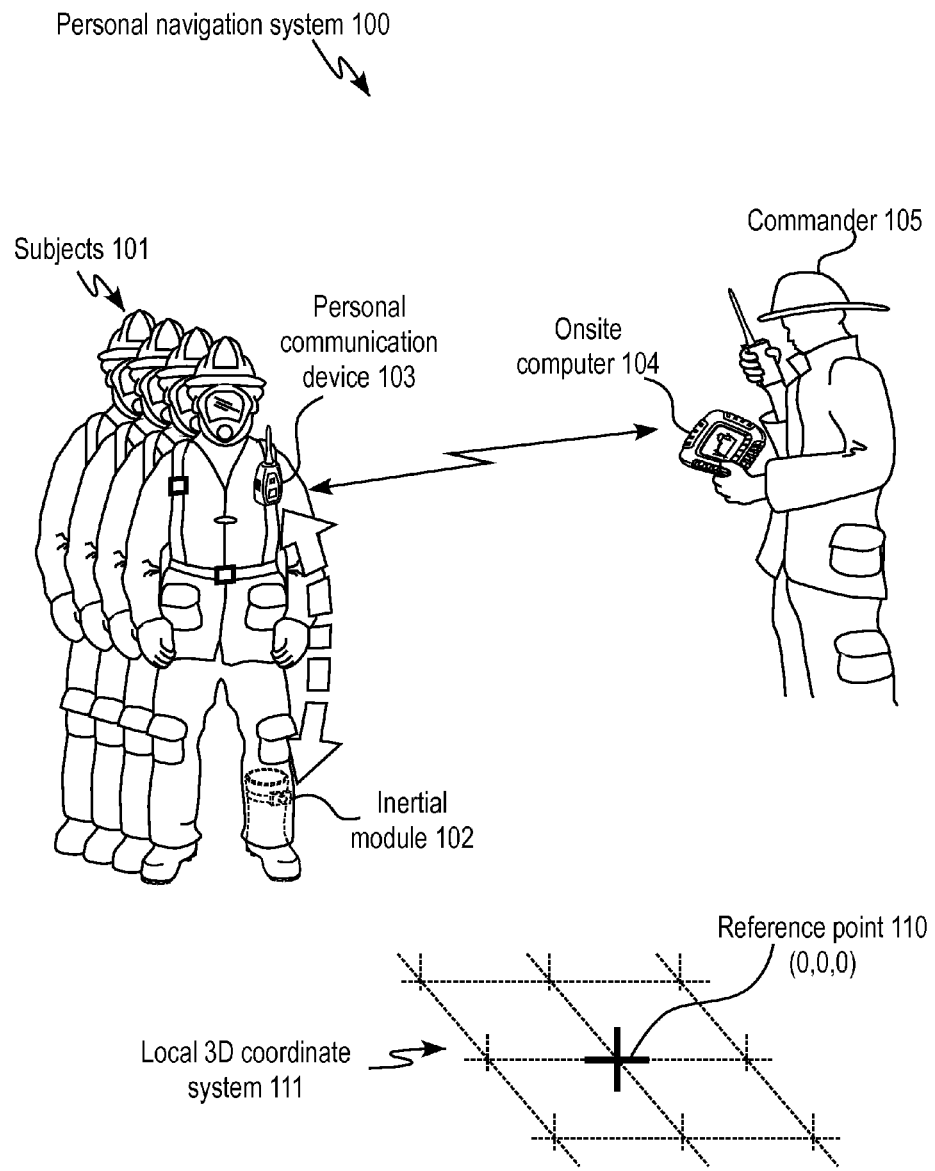
FIG. 1 is a schematic view of one embodiment of a personal navigation system for use in connection with a navigational system initialization system and arrangement according to the principles of the present invention.

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. Further, it is to be understood that the invention may assume various alternative variations and step sequences, except where expressly specified to the contrary.

The present invention is directed to a navigational system initialization system, process, and arrangement for use in initializing and determining a common coordinate system for use in connection with at least one user wearing a personal navigation system. As discussed in detail hereinafter, the presently-invented system, process, and arrangement can be implemented in a variety of applications, and utilized to calculate, process, and/or determine the appropriate data for use in providing a common coordinate system, heading, position, or the like.

The present invention can be used in connection with a variety of different types of navigational systems, including personal navigation systems, wearable navigation systems, systems for primary use outdoors, systems for primary use indoors, GPS, INS, foot-based navigational systems, and the like. One primary goal of the present invention is to provide systems, processes, and arrangements that permit a personal navigation system to be initialized and set to a common reference coordinate system, which can be used in connection with multiple users in an environment.

While the following description of the personal navigation system of the present disclosure is provided in the context of a first responder application (e.g., for tracking firefighters in or near a building), this is exemplary only. The personal navigation system of the present disclosure is not limited to use in first responder applications only. Rather, the personal navigation system of the present disclosure may be used in any navigation and/or tracking application in any indoor or outdoor environment. Further, the personal navigation system of the present disclosure is not limited to the tracking of persons, as it is also suitable for tracking objects.

As discussed, and although not limiting, the present invention is particularly useful in connection with a personal navigation system worn by a user. Further, and in one preferred and non-limiting embodiment, the presently-invented system, process and arrangement is used in connection with a foot-based (e.g., mounted on or in a boot on the user's foot) personal navigation system. In a further preferred and non-limiting embodiment, the foot-based personal navigation system is an Inertial Navigation System (INS), as discussed above. Such an INS, as well as the general control, display, and navigational management system is shown and described in U.S. Provisional Patent Application No. 61/229,824, which is incorporated herein by reference in its entirety. FIGS. 1-5 of the '824 application correspond with FIGS. 1-5 of the present application.

FIG. 1 illustrates a functional block diagram of an example of a personal navigation system 100, according to one preferred and non-limiting embodiment of the present disclosure. Preferably, personal navigation system 100 is an example of an inertial navigation system (INS) that is characterized by: (1) its ability to accurately and reliably track one or more subjects indoors and/or outdoors in real time, (2) its ability to identify the type of activity of the one or more subjects in real time, (3) its ability to accurately and reliably render a graphical representation of the activities of the one or more subjects in real time; and (4) its low complexity and low cost.

Preferably, personal navigation system 100 includes the combination of inertial sensor devices and a communication device, both of which are wearable by the subject of the navigation and/or tracking operations of the system. For example, one or more subjects 101 may be associated with personal navigation system 100, where each subject 101 may be any individual who is the subject of the navigation and/or tracking operations of the system. In one example, in the context of a first responder application, each subject 101 may be a firefighter that is being tracked in or near a building at the scene of an incident. Each subject 101 that is associated with personal navigation system 100 is wearing an inertial sensor module 102.

Inertial sensor module 102 houses one or more inertial sensors (e.g., one or more accelerometers and/or gyroscopes), along with control electronics and software. Preferably, inertial sensor module 102 is mounted on the footgear of each subject 101 and below the ankle of each subject 101. Inertial sensor module 102 may be mounted on the footgear of each subject 101 via, for example, a strap or harness or by integration into the footgear itself. The control electronics and software of inertial sensor module 102 is able to process the raw location data (i.e., raw x-y-z coordinates) in order to: (1) determine the type of activity of the respective subject 101, and (2) apply activity-specific error correction to the raw data in order to generate "corrected" location data (i.e., corrected x-y-z coordinates) that accurately indicates its location. Additionally, inertial sensor module 102 has short range radio capability for transmitting any data thereof. More details of an example of an inertial sensor module 102 are described with reference to FIGS. 2A and 2B.

Each subject 101 associated with personal navigation system 100 is also wearing a personal communication device 103. Preferably, personal communication device 103 has both short range and long range radio capability. For example, the short range radio capability of personal communication device 103 is able to receive data from inertial sensor module 102 that is also being worn by each subject 101. Additionally, the long range radio capability of personal communication device 103 is able to communicate with any other computing device that is not in its close range vicinity. For example, each personal communication device 103 is able to transmit the data received from its corresponding inertial sensor module 102 along with any other data to, for example, an onsite computer 104. In this way, the combination of an inertial sensor module 102 and a personal communication device 103 worn by each subject 101 provides the means for supplying accurate location information of the subject to any interested parties at the scene of the incident. More details of an example of a personal communication device 103 are described with reference to FIGS. 3A and 3B.

Onsite computer 104 may be any computing device that is capable of processing and executing program instructions. Onsite computer 104 may be generally any device including, or connected to, a processor and a user interface. Preferably, onsite computer 104 is a portable computing device, such as a handheld computer, laptop computer, or tablet device.

Onsite computer 104 may be used by any individual who, for example, is overseeing and/or directing the activities associated with personal navigation system 100. Continuing the example of a first responder application, onsite computer 104 may be used by a commander 105. In this example, commander 105 may be the incident commander at, for example, the scene of a fire and who is overseeing and/or directing the activities of subjects 101, who may be firefighters. Onsite computer 104 has radio communication capability for receiving/transmitting data from/to one or more personal communication devices 114. Further, residing on onsite computer 104 is a software application for processing in real time any information received from personal communication devices 114 and rendering a graphical representation of the activities of subjects 101 at the scene, also in real time. More details of an example of an onsite computer 104 are described with reference to FIGS. 4A and 4B.

FIG. 1 also shows a reference point 110, which is a common reference point to which all inertial modules 102 of personal navigation system 100 are initialized before entering the environment. Reference point 110 is the "origin" or (x=0, y=0, z=0) point of a local three-dimensional (3D) coordinate system 111 that is established in relation to inertial modules 102 of personal navigation system 100 during an initialization process.

Figure 2A:
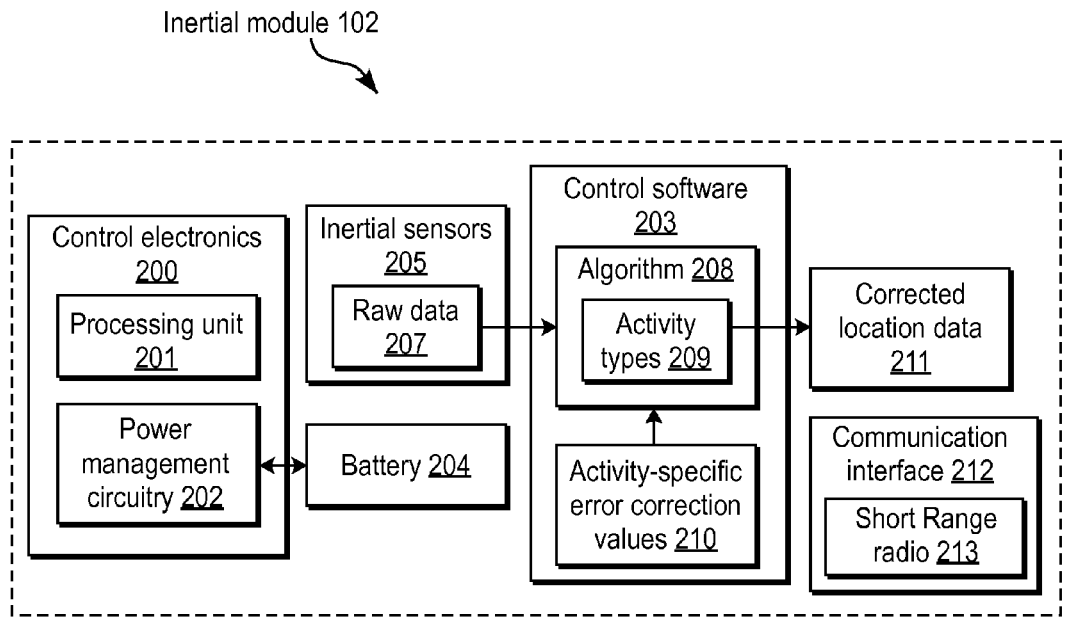
FIG. 2A is a block diagram of an inertial module of the personal navigation system of FIG. 1.

FIG. 2A illustrates a functional block diagram of an example of inertial sensor module 102 of personal navigation system 100, according to the present disclosure. In this example, inertial sensor module 102 includes control electronics 200 that may further include a processing unit 201 and power management circuitry 202. Processing unit 201 may be any standard controller or microprocessor device that is capable of executing program instructions, such as those from control software 203 of inertial sensor module 102. Processing unit 201 is used to manage the overall operations of inertial sensor module 102. Power management circuitry 202 may be any circuitry for performing power management functions of inertial sensor module 102. In one example, power management circuitry 202 provides power regulation and may be used for recharging a battery 204 of inertial sensor module 102. Preferably, battery 204 is a rechargeable battery, but may, alternatively, be a non-rechargeable battery. Generally, control electronics 200 may be used to manage data acquisition operations, data transmission operations, device power up and down sequences, initialization processes, and the acquisition of a (0, 0, 0) reference point, such as reference point 110 of FIG. 1.

Inertial sensor module 102 includes a set of inertial sensors 205. For example, inertial sensors 205 may include one or more electromagnetic sensors, multi-axis accelerometers, gyroscopes, magnetometers, and the like. Inertial sensors 205 may be implemented as small, low cost Micro Electro Mechanical Systems (MEMS) devices, rather than the large expensive military grade sensors. Even though there may be a significant amount of "drift error" associated with the small, low cost MEMS devices, their use is made possible by certain error correction processes of control software 203 of inertial sensor module 102 that allow any inaccuracy in the readings from the MEMS devices to be sufficiently error-corrected. This is otherwise not possible in many inertial navigation systems. Raw data 207 represents the raw, unprocessed readings of inertial sensors 205.

Inertial sensors, such as inertial sensors 205, include those that measure force and from it develop acceleration, velocity, and displacement. One type of inertial sensor is an accelerometer. Accelerometers are sensing transducers that provide an output proportional to acceleration, vibration, and shock. An accelerometer is a device for measuring acceleration and gravity-induced reaction forces. A multi-axis accelerometer (e.g., 3-axis accelerometer) is able to detect magnitude and direction of the acceleration as a vector quantity. The acceleration may be expressed in terms of g-force, which is a measurement of an object's acceleration. Another type of inertial sensor is a gyroscope, which is an inertial device that reacts to a change in orientation and can be used either to maintain the orientation or to report a change in the orientation.

Control software 203 may include, for example, a zero velocity updates (ZUPT) algorithm 208 for analyzing raw data 207 of inertial sensors 205, determining certain activity types 209, and then applying activity-specific error correction values 210 in order to generate corrected location data 211. For example, the process that is performed by a ZUPT algorithm 208 may be based on the systems and methods for measuring movement that are described with reference to U.S. Pat. No. 5,724,265 entitled "System and method for measuring movement of objects;" U.S. Pat. No. 5,899,963 entitled "System and method for measuring movement of objects;" U.S. Pat. No. 6,122,960 entitled "System and method for measuring movement of objects;" and U.S. Pat. No. 6,305,221 entitled "Rotational sensor system;" and any combinations thereof and, thus, the disclosures of these patents are incorporated herein in their entirety.

By way of example, the '221 patent describes a device that measures the distance traveled, speed, and height jumped of a person while running or walking. Accelerometers and rotational sensors are placed in the sole of one shoe along with an electronic circuit that performs mathematical calculations to determine the distance and height of each step. A radio frequency transmitter sends the distance and height information to a wristwatch or other central receiving unit. A radio frequency receiver in the wristwatch or other unit is coupled to a microprocessor that calculates an output speed based upon step-distance and elapsed time, and the distance traveled of the runner from the sum of all previous step distances. The output of the microprocessor is coupled to a display that shows the distance traveled, speed, or height jumped of the runner or walker.

The process that is performed by the ZUPT algorithm 208, which may be based on the '265, '963, '960, and/or '221 patents, may include, but is not limited to, the following steps.

Step 1—Continuously analyze raw data 207 of inertial sensors 205 in order to detect the presence of two conditions occurring simultaneously. The first condition to be detected is the minimum of the acceleration norm in 3 axes, which is measured using, for example, the 3-axis accelerometer of inertial sensors 205. That is, if the resultant vector of the 3 axes is the norm, the minimum of the acceleration may be detected. The second condition to be detected is the minimum angular velocity norm, which is measured using, for example, the gyroscope of inertial sensors 205.

Step 2—Detect the "quiescent point" for the two aforementioned quantities. When both the acceleration norm and the angular velocity norm are at minimum at the same time, this is hereafter referred to as the "quiescent point" in time. This quiescent point is based on the placement of inertial sensor module 102 at the foot of each subject 101, as the foot is the only part of the body that stops for any activity (e.g., walking, running, crawling, climbing, rappelling, jumping, falling, riding an elevator, and riding an escalator). Therefore, the detection of the "quiescent point" indicates the foot stopping.

Step 3—Measuring any motion of inertial sensors 205 that is present at the "quiescent point" in time indicates the drift error of the sensors. In this way, the drift error of the sensors is determined. The drift error can then be subtracted out of the reading to achieve a precise dynamic measurement. Therefore, once the "quiescent point" in time is detected, a process that may be referred to as zero velocity updates, or ZUPT, may be triggered.

Step 4—In the ZUPT process, raw data 207 of inertial sensors 205 is further analyzed in order to determine the orientation of the subject's 101 foot.

Step 5—Once the orientation of the subject's 101 foot has been determined, the orientation of the foot may be correlated to a certain type of activity. For example, activity types 209 of ZUPT algorithm 208 may contain the correlation of foot orientation to activity type. The types of activities that may be correlated in activity types 209 may include, but are not limited to, walking, running, crawling, climbing, rappelling, jumping, falling, riding an elevator, riding an escalator, and the like.

Step 6—Once the activity type has been determined, the ZUPT algorithm 208 may apply other verification processes in order to ensure that the type of activity has been determined correctly.

Step 7—Because the error correction may be different for each activity type, once the type of activity is determined, predetermined activity-specific error correction may be applied. For example, the contents of activity-specific error correction values 210 may include unique error correction values for walking, unique error correction values for running, unique error correction values for crawling, unique error correction values for jumping, and so on. These activity-specific error correction values may be empirically determined and characterized in advance according to the '265, '963, '960, and/or '221 patents.

Referring again to the aforementioned process steps of the ZUPT algorithm 208, because a "quiescent point" occurs with each footstep of a certain subject 101, ZUPT may be applied at each footstep and, therefore, the drift error of inertial sensors 205 is corrected at each footstep of subject 101. The result is corrected location data 211 for each inertial sensor module 102. Corrected location data 211 includes activity type information as well as location information. Further, corrected location data 211 may include timestamp information provided by processing unit 201 and device identification for identifying the source of the information.

Inertial sensor module 102 further includes a communication interface 212, which may be used for transmitting corrected location data 211 to an external device, including onsite computer 104. Communication interface 212 may be any wired and/or wireless communication interface by which information may be exchanged with other devices. Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, Bluetooth® technology, Wi-Fi, Wi-Max, IEEE 802.11 technology, radio frequency (RF), Infrared Data Association (IrDA) compatible protocols, Local Area Networks (LAN), Wide Area Networks (WAN), Shared Wireless Access Protocol (SWAP), any combinations thereof, and other types of wireless networking protocols.

Preferably, communication interface 212 of inertial sensor module 102 includes short range radio capability, such as a short range radio 213 that is based on, for example, Bluetooth® or Zigbee technology, which uses the short-distance wireless communications standard based on the IEEE 802.15.4 standard. For each subject 101, short range radio 213 facilitates a wireless personal area network (PAN) between his/her inertial sensor module 102 and his/her personal communication device 103.

Figure 2B:
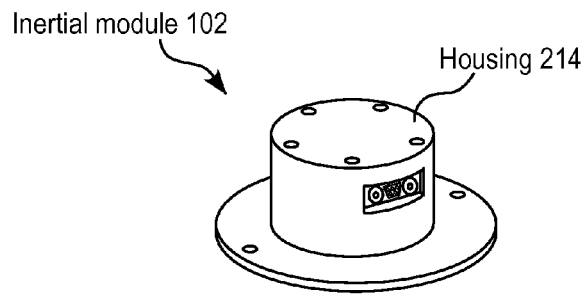
FIG. 2B is a perspective view of the inertial module of FIG. 2A.

FIG. 2B illustrates a perspective view of an example physical implementation of inertial sensor module 102 of personal navigation system 100, according to the present disclosure. For example, inertial sensor module 102 may be packaged in a housing 214, such as shown in FIG. 2B. Housing 214 may have any attributes needed to operate in a hostile environment. For example, housing 214 may be rugged, waterproof, heat resistant, dust resistant, and so on. The shape of housing 214 is suitable to be foot-mounted and, in particular, to be suitably anchored in substantially the same position relative to the foot at all times.

Figure 3A:
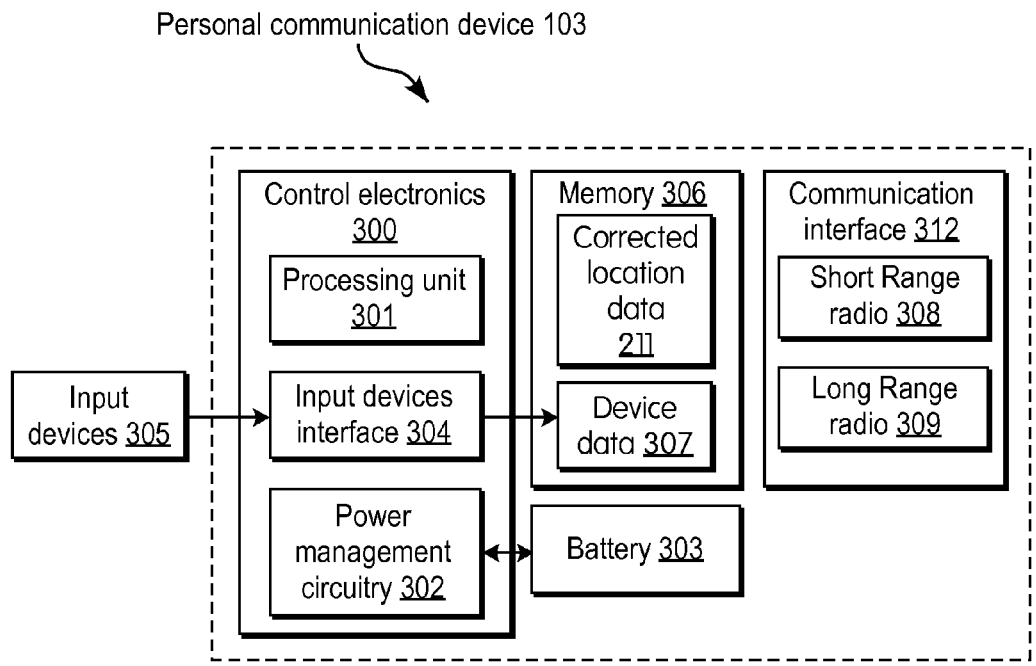
FIG. 3A is a block diagram of a personal communication device of the personal navigation system of FIG. 1.

FIG. 3A illustrates a functional block diagram of an example of personal communication device 103 of personal navigation system 100, according to the present disclosure. In this example, personal communication device 103 includes control electronics 300 that may further include a processing unit 301 and power management circuitry 302. Processing unit 301 may be any standard controller or microprocessor device that is capable of executing program instructions. Processing unit 301 is used to manage the overall operations of personal communication device 103. Power management circuitry 302 may be any circuitry for performing power management functions of personal communication device 103. In one example, power management circuitry 302 provides power regulation and may be used for recharging a battery 303 of personal communication device 103. Preferably, battery 303 is a rechargeable battery, but may, alternatively, be a non-rechargeable battery. Generally, control electronics 300 may be used to manage data acquisition operations, data transmission operations, device power up and down sequences, initialization processes, and so on.

Control electronics 300 may also include an input devices interface 304 for connecting (wired or wirelessly) to any number and types of input devices 305. Input devices 305 may be any devices worn by subjects 101 and/or incorporated into or associated with the equipment of subjects 101. For example, input devices 305 may include environmental sensors, such as, but not limited to, temperature sensors, light sensors, humidity sensors, and the like. Input devices 305 may include equipment sensors, such as, but not limited to, the PASS alarm or the air pressure sensor of the air tank of a firefighter. Input devices 305 may include biological sensors for monitoring the health status of subjects 101, such as, but not limited to, a blood pressure sensor, a perspiration sensor, a heart rate sensor, and the like. Input devices 305 may include other devices, such as, but not limited to, a digital camera and a digital audio recorder.

Personal communication device 103 includes local memory 306 for storing, for example, device data 307, which includes any readings returned from input devices 305. Further, device data 307 may include timestamp information provided by processing unit 301 and device identification for identifying the source of the information. Also stored in memory 306 may be corrected location data 211 that is received from inertial sensor module 102, as described in FIG. 2A. Because corrected location data 211 and device data 307 include timestamp and device identification information, they may be correlated by any data processing application.

Personal communication device 103 further includes a communication interface 312, which may be used for exchanging information with inertial sensor module 102 and any other external device, such as onsite computer 104. Communication interface 312 may be any wired and/or wireless communication interface by which information may be exchanged with other devices. Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, Bluetooth® technology, Wi-Fi, Wi-Max, IEEE 802.11 technology, RF, IrDA compatible protocols, LAN, WAN, SWAP, any combinations thereof, and other types of wireless networking protocols.

Preferably, communication interface 312 of personal communication device 103 includes short range radio capability, such as a short range radio 308 that is based on, for example, Bluetooth® or Zigbee® technology, which use the short-distance wireless communications standard based on the IEEE 802.15.4 standard. For each subject 101, short range radio 308 facilitates a wireless PAN between his/her inertial sensor module 102 and his/her personal communication device 103.

Preferably, communication interface 312 of personal communication device 103 also includes long range radio capability, such as a long range radio 309 that is based on, for example, Wi-Fi technology, which uses the wireless communications standard based on the IEEE 802.11 standard. For each subject 101, long range radio 309 facilitates a wireless LAN between his/her personal communication device 103 and, for example, onsite computer 104 (or some other remotely positioned computing device).

Figure 3B:
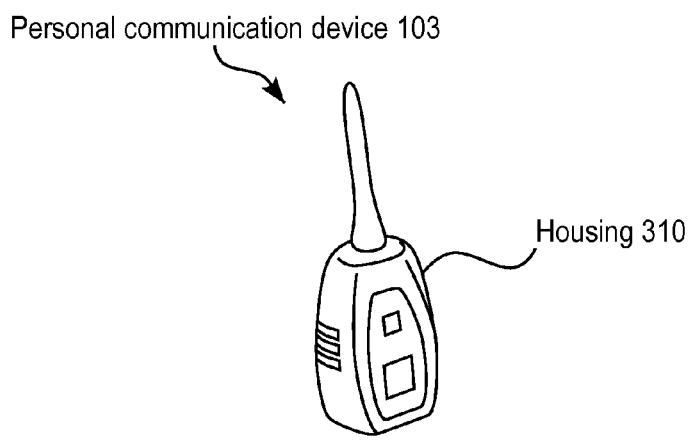
FIG. 3B is a perspective view of the personal communication device of FIG. 3A.

FIG. 3B illustrates a perspective view of an example physical implementation of personal communication device 103 of personal navigation system 100, according to the present disclosure. For example, personal communication device 103 may be packaged in a housing 310, such as shown in FIG. 3B. Housing 310 may have any attributes needed to operate in a hostile environment. For example, housing 310 may be rugged, waterproof, heat resistant, dust resistant, and so on. Attached to housing 310 may be a connector, which allows personal communication device 103 to be wearable, such as wearable around the shoulder of subjects 101 as shown in FIG. 1. Personal communication device 103 may be a standalone unit or may be integrated into another device worn by the subject 101, such as a self-contained breathing apparatus (SCBA) worn by a firefighter.

Figure 4A:
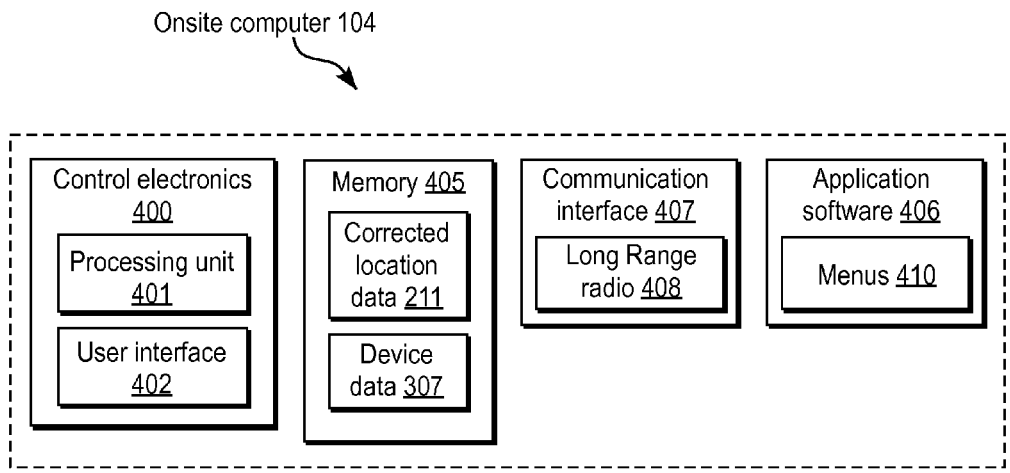
FIG. 4A is a block diagram of an onsite computer of the personal navigation system of FIG. 1.

FIG. 4A illustrates a functional block diagram of an example of onsite computer 104 of personal navigation system 100, according to the present disclosure. In this example, onsite computer 104 includes control electronics 400 that may further include a processing unit 401 and a user interface 402. Processing unit 401 may be any standard controller or microprocessor device that is capable of executing program instructions. Processing unit 401 is used to manage the overall operations of onsite computer 104.

Figure 4B:
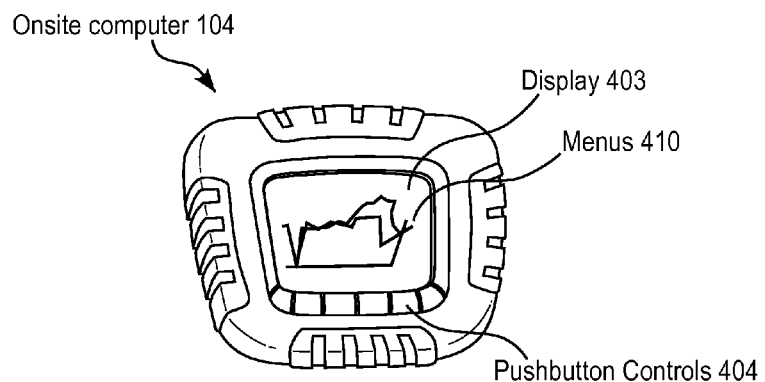
FIG. 4B is a perspective view of the onsite computer of FIG. 4A.

User interface 402 of onsite computer 104 may be formed of any mechanism or combination of mechanisms by which the user may operate the device and by which information that is processed by the device may be presented to the user. For example, user interface 402 may include, but is not limited to, a display, a ruggedized touch panel, a keyboard, a mouse, one or more pushbutton controls, a keypad, an audio speaker, and any combinations thereof. In one example, FIG. 4B shows a display 403 and a set of pushbutton controls 404.

Onsite computer 104 includes local memory 405 for storing, for example, device data 307 that is received from input devices 305 that may be connected to one or more personal communication devices 114. Also stored in memory 405 may be corrected location data 211 that is received from one or more inertial modules 102. Because corrected location data 211 and device data 307 include timestamp and device identification information, they may be correlated by any data processing application, such as application software 406 residing on onsite computer 104. Because corrected location data 211 and device data 307 that is associated with multiple subjects 101 is stored in memory 405, memory 405 serves a data warehouse function of personal navigation system 100 that may be managed by application software 406. Of course, it is further envisioned that a separate, remotely-located central control device or server may be used as the central data repository for processing and/or storing any of the data streams used in connection with the system 100.

Onsite computer 104 further includes a communication interface 407, which may be used for exchanging information with one or more personal communication devices 103. Communication interface 407 may be any wired and/or wireless communication interface by which information may be exchanged with other devices. Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, Bluetooth® technology, Wi-Fi, Wi-Max, IEEE 802.11 technology, RF, IrDA compatible protocols, LAN, WAN, SWAP, any combinations thereof, and other types of wireless networking protocols.

Preferably, communication interface 407 of onsite computer 104 includes long range radio capability, such as a long range radio 408 that is based on, for example, Wi-Fi technology. Long range radio 408 facilitates a wireless LAN between onsite computer 104 and, for example, any number of personal communication devices 103 (or the above-referenced central controller, of the personal navigation system 100).

Application software 406 of onsite computer 104 is a software application for acquiring and processing corrected location data 211 that originates from any number of inertial modules 102 and device data 307 that originates from any number of personal communication devices 114. Corrected location data 211 and device data 307 are analyzed by application software 406 for the purpose of presenting any useful information to the user and, in particular, for rendering a graphical representation of the locations and activities of subjects 101 at the scene of the incident, such as for rendering a graphical representation of the locations and activities of firefighters in or near a building at the scene of the incident. A set of menus 410 of application software 406 provide a graphical user interface (GUI) by which the graphical representation is displayed to the user thereof, such as to commander 105 who is using onsite computer 104.

FIG. 4B illustrates a perspective view of an example physical implementation of onsite computer 104 of personal navigation system 100, according to the present disclosure. In this example, onsite computer 104 is implemented as a handheld tablet device that includes display 403 and the set of push-button controls 404. FIG. 4B also shows that certain menus 410 may be presented to the user via display 403.

Referring to FIGS. 1 through 4B, the operation and use of personal navigation system 100 for tracking one or more subjects 101 who are wearing respective inertial modules 102 and personal communication devices 103 are described with reference to FIG. 5.

Figure 5:
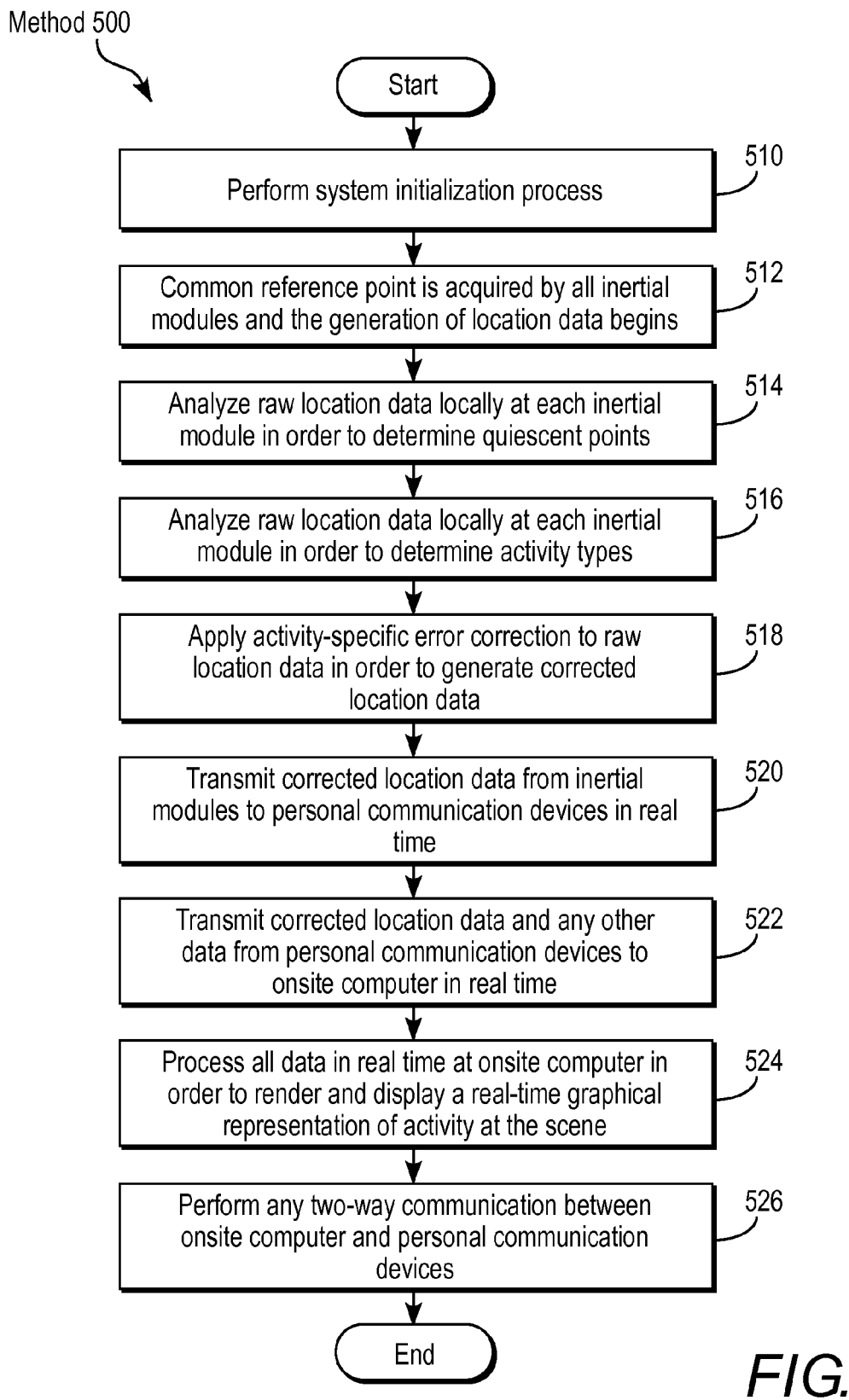
FIG. 5 is a flow diagram of a method for personal navigation using the personal navigation system of FIG. 1.

FIG. 5 illustrates a flow diagram of an example of a method 500 of operation of personal navigation system 100, according to the process described in Provisional Patent Application No. 61/229,824 application. Method 500 may include, but is not limited to, the following steps, which may be implemented in any order or omitted, as preferred.

At step 510, a system initialization process is performed. For example, an initialization process of personal navigation system 100 may include any preconditioning processes that are necessary for proper operation thereof. For example, the initialization process may include capturing the initial drifts and biases of inertial sensors 205 of each inertial sensor module 102, initializing the multiple inertial modules 102 to a common coordinate system and heading, which allows the multiple inertial modules 102 to be correlated to one another, and so on. Further, the initialization process may include forming a hard association between a certain inertial sensor module 102 and a certain personal communication device 103 worn by each subject 101. In this way, data transmission from the devices of one subject 101 may not be confused with data transmission from the devices of another subject 101.

At step 512, a common reference point, such as reference point 110 of FIG. 1, is acquired by all inertial modules 102 and inertial modules 102 begin generating location data. In one example, a certain location at the scene of the incident may be designated as the common launch off point of all subjects 101. For example, the designated launch off point may be the front entrance of a building at the scene. In this case, each subject 101 physically goes to the designated launch off point at the front entrance of the building and initiates a reference capture event of his/her inertial sensor module 102. This may occur, for example, by pressing a "reference capture" button on each personal communication device 103, which communicates the reference capture event to its corresponding inertial sensor module 102. Thereafter inertial modules 102 compute their own updated position and velocity by integrating information received from inertial sensors 205. In doing so, inertial modules 102 begin generating location data, such as raw data 207.

At step 514, the raw location data is analyzed locally at each inertial module in order to determine the quiescent points. For example, at each inertial sensor module 102, the ZUPT algorithm 208 is used to process and analyze raw data 207 in order to determine the "quiescent points" of its inertial sensors 205, as detailed in one or more of the '265, '963, '960, and/or '221 patents, and as described with reference to FIG. 2A.

At step 516, the raw location data is analyzed locally at each inertial module in order to determine activity types. For example, at each inertial sensor module 102, having determined the "quiescent points" in time of its inertial sensors 205, the ZUPT algorithm 208 further analyzes raw data 207 in order to determine the activity type associated with the movement and/or orientation of the inertial sensors 205 at the "quiescent points" in time, according to one or more of the '265, '963, '960, and/or '221 patents, and as described with reference to FIG. 2A. For example, activity types 209 of the ZUPT algorithm 208 may contain the correlation of foot orientation to activity type. The types of activities may include, but are not limited to, walking, miming, crawling, climbing, rappelling, jumping, falling, riding an elevator, riding an escalator, and the like.

At step 518, the activity-specific error correction is applied to the raw location data in order to generate corrected location data at each inertial module. For example, at each inertial sensor module 102, having determined the activity type, the ZUPT algorithm 208 applies the activity-specific error correction values 210 to raw data 207 in order to generate corrected location data 211 at each inertial module. For example, the ZUPT algorithm 208 may apply unique error correction values for walking, unique error correction values for miming, unique error correction values for crawling, unique error correction values for jumping, and so on, according to one or more of the '265, '963, '960, and/or '221 patents. The contents of corrected location data 211 includes, for example, the error-corrected x-y-z coordinates, activity type information, timestamp information, and device identification information.

At step 520, corrected location data 211 is transmitted in real time from the inertial modules 102 to their corresponding personal communication devices 103. For example, each inertial sensor module 102 transmits its corrected location data 211 via its short range radio 213. The corrected location data 211 is then received by the short range radio 308 of the corresponding personal communication device 103. The corrected location data 211 may be temporarily cached in memory 306 of personal communication device 103. Alternatively, the corrected location data 211 may be sent directly to onsite computer 104 or other remotely-positioned computing device or storage means.

At step 522, the corrected location data 211 and any other data, such as device data 307, is transmitted in real time from personal communication devices 114 to onsite computer 104. Both corrected location data 211 and device data 307 may include timestamp information and device identification information. Again, the contents of corrected location data 211 includes, for example, the error-corrected x-y-z coordinates as well as the activity type information.

At step 524, all data that is received at onsite computer 104 is processed in real time in order to render and display a real-time graphical representation of any activity at the scene. For example, all corrected location data 211 and/or device data 307 associated with all subjects 101 that is received at onsite computer 104 is processed by application software 406 in real time in order to render and display a real-time graphical representation of any activity at the scene, which may be presented to a user via menus 410 of application software 406.

At step 526, any two-way communication may be performed between onsite computer 104 and personal communication devices 103. For example, at any time throughout the operation of personal navigation system 100, two-way communication may be performed between onsite computer 104 and personal communication devices 103 of subjects 101 for any reason, such as to provide navigation instructions and/or to communicate an alert and/or any other useful information.

In another preferred and non-limiting embodiment, another INS, as well as the general control, display, and navigational management system is shown and described in U.S. patent application Ser. No. 12/497,761, which is incorporated herein by reference in its entirety. FIGS. 1 and 2 of the '761 application correspond with FIGS. 6 and 7 of the present application.

Figure 6:
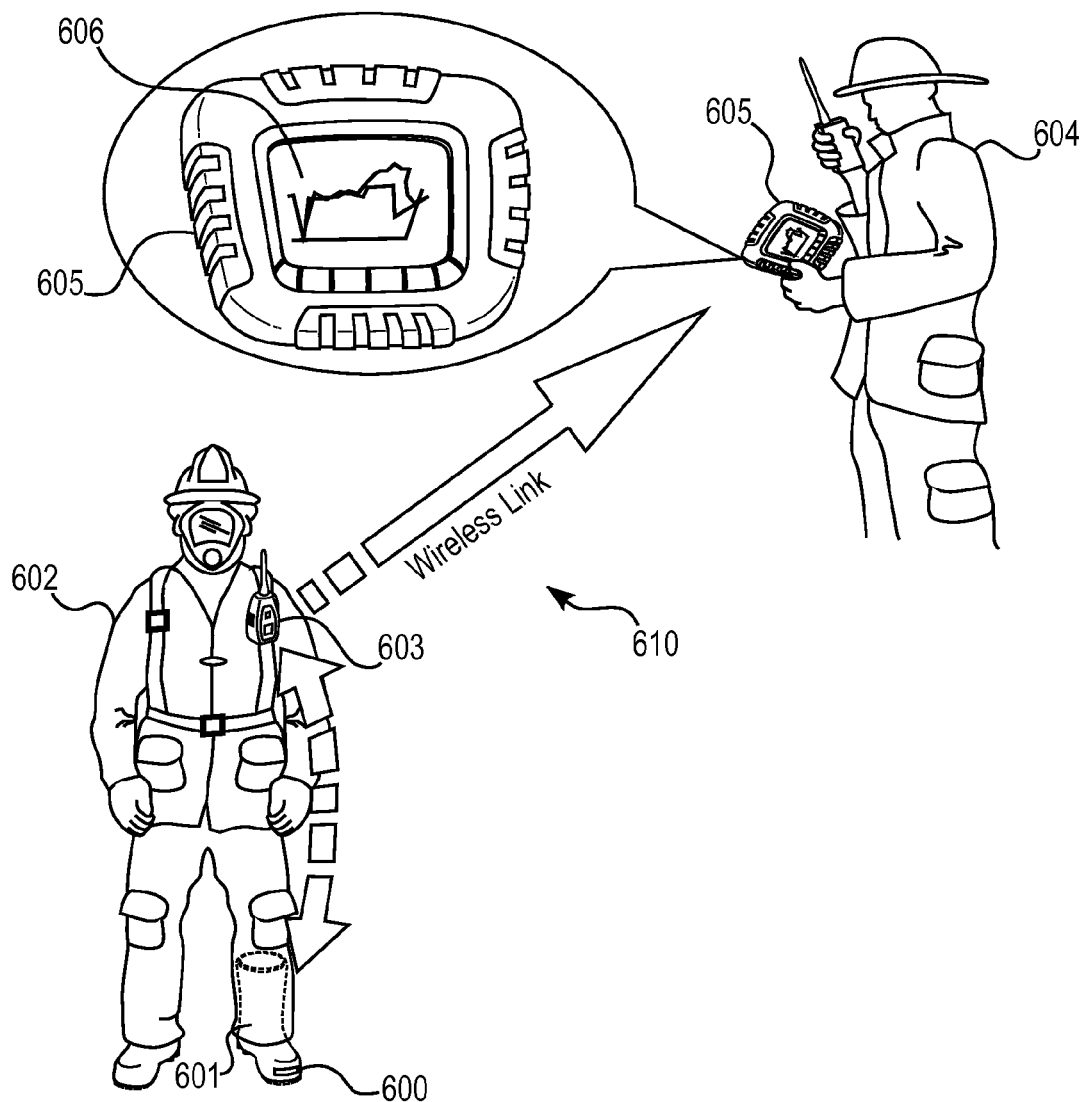
FIG. 6 is a schematic view of another embodiment of a personal navigation system for use in connection with a navigational system initialization system and arrangement according to the principles of the present invention.
Figure 7A:
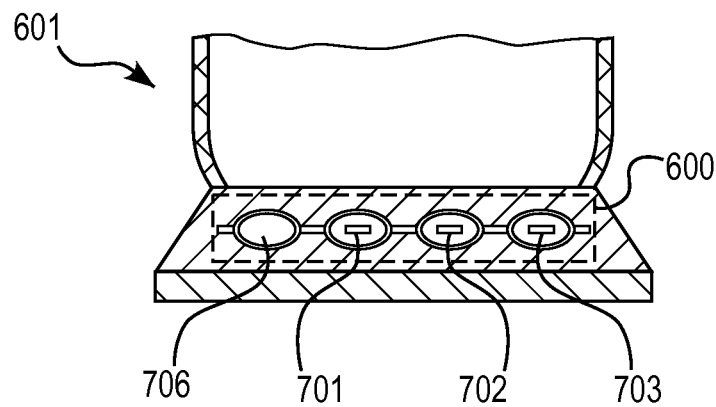
FIG. 7A is a perspective view of a mobile locator system of the personal navigation system of FIG. 6.
Figure 7B:
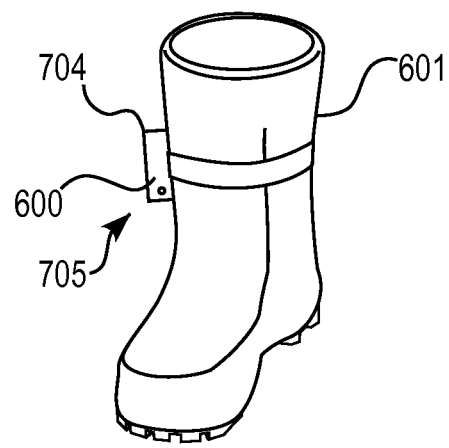
FIG. 7B is a perspective view of the mobile locator system of FIG. 7A in use with a user's boot.

As illustrated in FIG. 6, a mobile locator system 610 including an inertial navigation module 600 can, for example, be positioned near or at the toe portion of a boot 601 of a firefighter 602. Inertial navigation module 600 is used to determine the location of and track each firefighter, and communicate (for example, via a communication device 603 worn by each firefighter 602) information to, for example, the incident commander 604 and/or other remote personnel. In several embodiments, communication device 603 is a transceiver of a Personal Alert Safety System or PASS device worn by firefighter 602. Inertial navigation module 600 can, for example, have a wired or wireless connection with communication device 603. Inertial navigation module 600 can alternatively include a dedicated communication system including a transmitter or transceiver. Incident commander 604 and/or other personnel can, for example, be equipped with a base unit 605 that, for example, includes a display 606 to provide information of the location of one or more firefighters 602.

Inertial navigation systems can, for example, include acceleration sensors and angle rate sensors to measure the motion of one or more firefighters 602. Inertial navigation systems can further include software to infer the location of and track the movements of firefighters 602 from that information. As discussed hereinabove, inertial navigation systems and methods suitable for use in the present invention are, for example, described in one or more of the '265, '963, '960, and/or '221 patents.

FIG. 7 illustrates one embodiment of an inertial navigation module 600 for positioning in a sole of boot 601 as described in the '221 patent. However, as is clear to one skilled in the art, various components of the system may be implemented in a variety of arrangements and on a variety of positions on a firefighter's body. In the case that inertial navigation systems and/or methodologies as disclosed in one or more of the '265, '963, '960, and/or '221 patents are used in connection with mobile locator systems 610 of the present invention, the sensor of the mobile locator systems 610 are preferably placed on or near the foot. One skilled in the art appreciates that use of other tracking and/or inertial navigation system algorithms or methodologies can enable positioning of the systems at other positions on the body.

In one embodiment, accelerometers 701, rotational sensors 702 and a contact switch 703 are placed, for example, in a sole of boot 601 (see FIG. 7A) so that they may come in contact with the ground for each step during walking, running etc. In another embodiment, accelerometers 701, rotational sensors 702, and switch 703 are contained within a housing 704 (see, for example, FIG. 7B) of a user-worn system 705 that is attached to an exterior portion of boot 601.

Inertial navigation module 600 can operate with or without contact switch 703. For example, another mechanism can be used to generate a signal to indicate the beginning of each step. Inertial navigation module 600 can, for example, include three rotational sensors 702, each configured to measure the angle of the user's foot with respect to a reference frame. Each rotational sensor 702 converts the measured angle into a corresponding signal, which is employed by a processor 706 (for example, a microprocessor) to calculate information related to the user's movements, such as the user's speed, distance traveled, and the height climbed or jumped.

Inertial navigation module 600 can also include, for example, three accelerometers 701, each configured to measure the acceleration of the user's foot with respect to a reference frame. Each accelerometer can, for example, convert a measured acceleration into a corresponding signal, which can be processed by processor 706 to accomplish movement measurements.

Three linear accelerometers 701 can, for example, be provided with one in each of the x, y, and z direction. Likewise, three rotational sensors 702 can, for example, be provided with one on each of the x, y, and z axes. When inertial navigation module 600 is initially at rest, these directions define a reference coordinate system. Rotational sensors 702 can, for example, be velocity rotation devices, such as a gyroscope, which measure rotational velocity. Rotational sensors 702 are not accelerometers and, therefore, do not measure acceleration or angular acceleration. The output of each rotational sensor 702 can, for example, be integrated once to determine the angles defining the orientation of sensors 702 as a function of time. Thus, these angles define a translational coordinate system that varies in three dimensions throughout a stride. The output of each linear accelerometer 701 is integrated twice in the reference coordinate system to determine a distance in each of the x, y, and z directions. These values are then used to calculate a new location point relative to a previous point.

Preferably, rotational sensors 702 and the linear accelerometers 701 are located on the foot of firefighter 602 as described above. In one embodiment, when the foot stops, the outputs of linear accelerometers 701 and rotational sensors 702 are observed. Since there should be no signals when the foot is stopped, any outputs are known to be error signals and are then subtracted from the last calculated value to establish a new reference point for the next calculation cycle (that is, until the foot comes to rest again). Linear accelerometers 701 are, for example, orthogonal to each other and placed as close together as possible.

Accelerometers 701 are located at the origin of the axes which define the reference coordinate system when the foot is at rest. This reference system remains stationary throughout a step. The translational coordinate system, which is formed of the three axes aligned with rotational sensors 702, moves with the foot. The readings in the translational coordinate system are calculated to determine the actual motion within the reference coordinate system. At the end of a step, the beginning and ending points are used to determine the distance traveled in three dimensions. Since the coordinate systems are three dimensional, any two axes will define a plane. However, the planes are not defined with respect to the foot or to the ground. They may be in any orientation as defined by the orientation of the sensors on the foot and by the orientation of the foot on the ground. However, these planes are not used as part of any calculations by inertial navigation module 600. In this way, module 600 does not use a datum plane, let alone one defined by the sole of boot 601 or with reference to the ground when the foot is at rest on the ground.

As illustrated in various preferred and non-limiting embodiments in FIGS. 8-16, the present invention generally provides an initialization system 1 for use in connection with a personal navigation system 2 worn by or associated with a user 3, such as the inertial module 102 attached to the boot of the subject 101 in the embodiment of FIGS. 1-5 or the inertial navigation module 600 integrated in the sole of the boot 601 of the firefighter 602 in FIGS. 6 and 7. This initialization process would be preferably implemented during step 510 or between steps 510 and 512 (discussed above and illustrated in FIG. 5).

It should be noted that the requirement of placing all of the users 3 on a common coordinate system is necessary to display each firefighter 602 on the display 606. When using the above-discussed inertial navigation system, the various required values x, y, z, θ, and the like are established using accelerometers, gyroscopes, and similar motion-sensing devices. As is well known, each of these devices forming the individual personal navigation system 2 of each user 3 include different errors, biases, and other discrepancies, such that each personal navigation system 2 is on its own unrelated coordinate system. The present invention generally provides the innovative ability to place all of these individual and unique personal navigation systems 2 on a common coordinate system for effective tracking and data gathering in the required environment.

With reference to FIG. 8, the present invention includes an arbitrary first reference point arrangement 4 that is configured or adapted for communication (or in some sensing relationship) with the personal navigation system 2 of the user 3. As discussed above, such communication can be wireless, hard-wired, direct, indirect, signal based, or any combination thereof. Regardless, the first reference point arrangement 4 may include a sensor 10 for communicating with or otherwise obtaining or determining data from the components of the personal navigation system 2. Alternatively, the data collection or sensor 10 can be included with the personal navigation system 2, and the sensed relationship between the personal navigation system 2 and the first reference point arrangement 4 is transmitted by the personal navigation system 2. Accordingly, the relationship between the personal navigation system 2 and the first reference point arrangement 4 is used to generate a first user data set 5, which includes a horizontal position and azimuth angle $(x_1, y_1, \theta_1)$.

An arbitrary second reference point arrangement 6 is also included, and is structured in a manner similar as the first reference point arrangement 4, i.e., including a sensor 10, a device for communication with one or more of the components of the personal navigation system 2, or facilitating a relationship between the second reference point arrangement 6 and the personal navigation system 2. Therefore, this second reference point arrangement 6 is also in communication (or in a sensed relationship) with the personal navigation system 2 of the user 3. This second reference point arrangement 6 is used to generate a second user data set 7, also including a horizontal position and azimuth angle $(x_2, y_2, \theta_2)$.

The initialization system 1 further provides at least one control device 8, and this control device 8 may be integrated with one or both of the first reference point arrangement 4 and second reference point arrangement 6, positioned on or associated with the personal navigation system 2, or may be a stand-alone unit, such as the onsite computer 104 (FIG. 1) or base 1 nit 605 (FIG. 6). In this manner, the control device 8 may be in communication with one or both of the first reference point arrangement 4 and second reference point arrangement 6 or integrated therewith, or otherwise configured to obtain the first user data set 5 and the second user data set 7 (such as through the communication device of another component). Still further, this communication can be wireless, hard-wired, direct, indirect, signal based, or any combination thereof. Any of the above-discussed communication standards and architectures may also be used in connection with the components of the initialization system 1. It is this control device 8, which may be in the form of a computing device, a computer, a portable computing device, a laptop, a server, or the like, that determines a common coordinate system 9 based at least in part upon the first user data set 5 and the second user data set 7.

In operation, the user 3 powers up or initiates his personal navigation system 2 and makes direct or indirect contact with the first reference point arrangement 4, which then establishes the first user data set 5 by communicating with one or more of the components of the personal navigation system 2. The user 3 then moves forward and makes direct or indirect contact with the second reference point arrangement 6, which generates the second user data set 7. Based upon at least the first user data set 5 and the second user data set 7, the common coordinate system 9 is established and determined based upon an initial horizontal position and azimuth angle of (0, 0, 0) and a subsequent horizontal position and azimuth angle (at the second reference point arrangement 6) of (1, 0, 0). By making such a determination, all of the unique personal navigation systems 2 of each user 3 are translated into the common coordinate system 9, thereby providing commonality in determining the heading and/or position of each individual user 3.

The control device 8 can receive, transmit, and process data, and is capable of determining or establishing vectors between the first reference point arrangement 4, the second reference point arrangement 6, an angle between vectors, calculated positions, one or more azimuths, a heading, and the like. In particular, by obtaining the information and data associated with the first user data set 5 and the second user data set 7, the control device 8 can make the appropriate determination. See FIG. 9. This determination of the common coordinate system 9 can be established for each user without regard to the true positions of the first reference point arrangement 4 and the second reference point arrangement 6 and/or the distance between the first reference point arrangement 4 and the second reference point arrangement 6. Instead, the first reference point arrangement 4 is considered to be at (0, 0, 0) on the common coordinate system 9 and the second reference point arrangement 6 is considered to be (1, 0, 0) on the common coordinate system 9. It is further envisioned that this second reference point arrangement 6 can be used in establishing the local coordinate system 111 and reference point 110, as discussed above and illustrated in FIG. 1. For example, the second reference point arrangement 6 may be the takeoff or initiation point for entry into the environment by the user 3.

In one preferred and non-limiting embodiment, the first reference point arrangement 4 and the second reference point arrangement 6 are formed in spaced positions of a single portable structure 11. For example, this portable structure 11 may be an elongated mat 12 that can be rolled out or placed on the ground. It is this mat 12 that can incorporate or otherwise integrate the first reference point arrangement 4 and second reference point arrangement 6, and further permit contact with the user 3 at an upper surface 13 thereof.

In a further preferred and non-limiting embodiment, and as shown in FIG. 11, the first reference point arrangement 4 is in the form of a first portable structure 14, and the second reference point arrangement 6 is in the form of a second portable structure 15. In the embodiment of FIG. 11, both the first portable structure 14 and the second portable structure 15 are in the form of an individual mat 16, again for placement on the ground. Each of these mats 16 include an upper surface 17 for direct or indirect contact with the user 3.

As discussed above, determining the position and distance between the first reference point arrangement 4 and second reference point arrangement 6 is not required to implement the present invention. Similarly, the orientation of the mats 16 may be variable, as the system and process of the present invention permit the appropriate determination of the relative location for establishing the common coordinate system 9. Therefore, it is further envisioned that each of the first reference point arrangement 4 and the second reference point arrangement 6 can be contacted by the user 3 at any point and in any orientation, which can be translated into the first user data set 5 and second user data set 7 and/or the initial point (0, 0, 0) and second point (1, 0, 0).

However, and in order to reduce the complexity of the necessary determinations and overall system requirements, one or more indicators 18 may be provided at the upper surface 17 of the mats 16 (or the upper surface 13 of the elongate mat 12). The indicator 18 may be a visual marking, an indentation, a boot-shaped visual marking, a boot-shaped indentation, or any combination thereof. As illustrated in FIG. 11, a visual marking 19 (and in particular a boot-shaped visual marking 20 with a reference arrow 21) is provided on each mat 16. This reduces the complexity of the system, and assists the user 3 to precisely locate his or her boot in the correct position and orientation for establishing the first user data set 5 and the second user data set 7.

Figure 12:
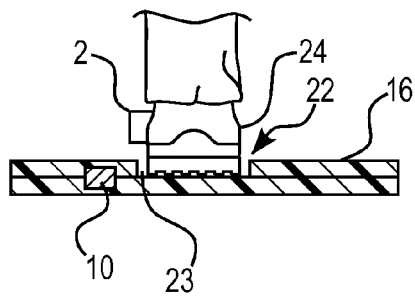
FIG. 12 is a rear and partial sectional view of a further embodiment of a navigational system initialization system and arrangement according to the principles of the present invention.

In a further embodiment, and as illustrated in FIG. 12, an indentation 22 is provided as a recess in the upper surface 17 of the mat 16, and this indentation 22 is in the form of a boot-shaped indentation 23. Again, this further ensures the correct positioning and orientation of a user's boot 24, thus providing additional accuracy and reducing processing time (with associated internal errors).

Figure 13:
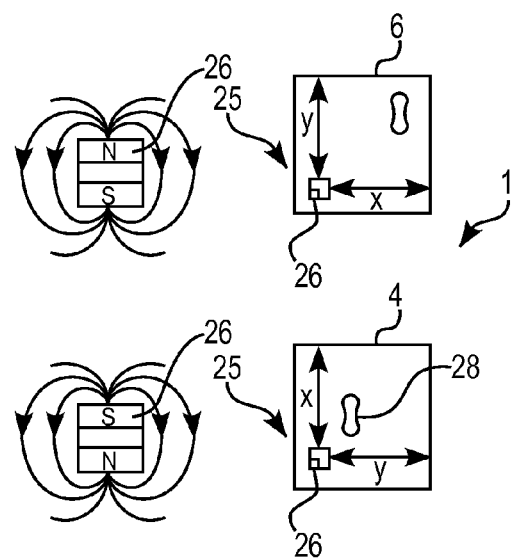
FIG. 13 is a schematic view of a still further embodiment of a navigational system initialization system and arrangement according to the principles of the present invention.

In a further preferred and non-limiting embodiment, the first reference point arrangement 4 and the second reference point arrangement 6 may be in the form of or integrate a variety of sensors 10 and/or sensing systems, such as a radio frequency arrangement, a magnetic field arrangement, a pressure sensing arrangement, an acoustic arrangement, an electrical arrangement, or the like. In one embodiment, and as shown in FIG. 13, a magnetic field arrangement 25 is utilized. Preferably, three stacked magnets 26 are included and are in magnetic communication with the personal navigation system 2, and, preferably, a magnetometer 27 positioned therein. As also illustrated in FIG. 13, the orientation of the stacked magnets 26 at the first reference point arrangement 4 can be opposite that of the stacked magnets 26 at the second reference point arrangement 6, i.e., polar opposites, resulting in opposite magnetic field orientations.

Figure 14A:
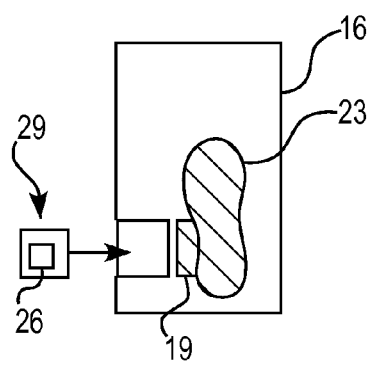
FIG. 14A is a plan view of another embodiment of a navigational system initialization system and arrangement according to the principles of the present invention.
Figure 14B:
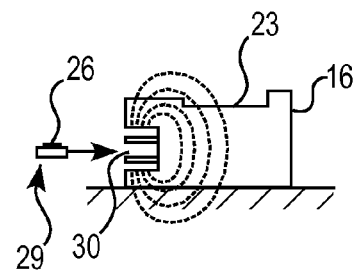
FIG. 14B is a sectional, rear view of the navigational system initialization system and arrangement of FIG. 14A.

With reference to FIGS. 14A and 14B, the magnets 26 and magnetometer 27 may be incorporated into a cartridge 29 that can be removably inserted into a slot 30 on the first reference point arrangement 4 and second reference point arrangement 6. This embodiment also illustrates the use of a boot-shaped indentation 23 to ensure appropriate positioning and orientation of the personal navigation system 2 with respect to the cartridge 29. In one preferred and non-limiting embodiment, the precise positioning of this cartridge 29 (and magnets 26) allow for the generation of the required flux field. In a further embodiment, the height of the reference point arrangements 4, 6 (or mats 12, 16) may be about 5 inches, which appears to represent the minimum height to prevent field collapse due to surrounding metal, e.g., concrete re-bar, or the like.

As also illustrated in FIG. 13, the control device 8 (or some device or sensor local to the reference point arrangements 4, 6 or personal navigation system 2) can be further used to determine a contact position 28 of the user 3 (preferably the boot 24 of the user 3). For example, by using the field strength (in the magnetic field arrangement 25), the contact position 28 can be analyzed and translated into a center point for the reference point arrangements 4 and 6 ((0, 0, 0) at the first reference point arrangement 4 and (1, 0, 0) at the second reference point arrangement 6). Therefore, the present invention is capable of establishing the appropriate points for use in determining the first user data set 5, second user data set 7, and/or the common coordinate system 9, without requiring a specific position and/or orientation of a contact position 28. For example, this may be considered as generating and utilizing a sub-coordinate system for use in appropriately generating the underlying data for determining the common coordinate system 9.

In another preferred and non-limiting embodiment, some indication action may occur that can be sensed by the user 3 upon making appropriate and communicative contact with the first reference point arrangement 4 and second reference point arrangement 6. For example, some audible, visual, tactile, olfactory, or combination thereof, indication may be communicated to the user 3 indicating that he has made appropriate contact with the first reference point arrangement 4 and second reference point arrangement 6, such that the first user data set 5 and second user data set 7 can be effectively determined. For example, the user 3 may hear a beep, or a component of his gear may vibrate to indicate that the personal navigation system 2 has been sensed and appropriate contact made to establish the user data set 5, 7 at either or both of the first reference point arrangement 4 and second reference point arrangement 6.

Figure 15:
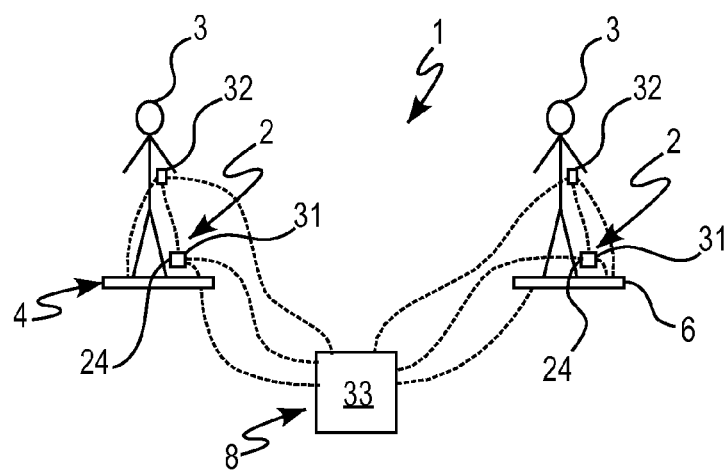
FIG. 15 is a schematic view of one embodiment of communication architecture in a navigational system initialization system and arrangement according to the principles of the present invention.

With reference to FIG. 15, and as discussed above, and in another preferred and non-limiting embodiment, the personal navigation system 2 is an inertial sensor module 31 located on the boot 24 of the user 3. This inertial sensor module 31 may include multiple inertial sensors and a communication device.

Further, and with continued reference to FIG. 15, a personal communication device 32 may be located on or attached to the user 3 for use in communicating with the first reference point arrangement 4, the second reference point arrangement 6, the personal navigation system 2, the control device 8, or any combination thereof. Similarly, the control device 8 may be an onsite computer 33 for communicating directly or indirectly with the first reference point arrangement 4, the second reference point arrangement 6, the personal navigation system 2, the personal communication device 32, or any combination thereof. This onsite computer 33 may be in the form of any of the computing devices and/or controllers discussed above. Again, it should be noted that the communication of the data is secondary to the sensing and generation of the user data sets 5, 7, such that the physical location of the sensors and/or controllers can be optimized, while still generating the user data sets 5, 7 and common coordinate system 9.

Figure 16:
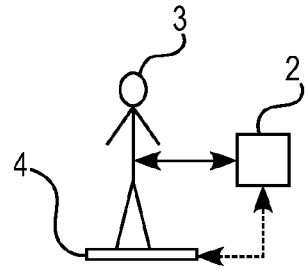
FIG. 16 is a diagram of one example implementation of a navigational system initialization system and arrangement according to the principles of the present invention.

As illustrated in FIG. 16 in schematic form, the presently-invented system, process, and arrangement are useful in connection with a variety of different types and technology-based personal navigation systems 2, and should not be construed as being limited to INS arrangements. In particular, the personal navigation system 2 is a unit that is somehow attached to, or otherwise in communication or association with, the user 3. Therefore, it is envisioned that the personal navigation system 2 can be any type of positioning system, such as an INS, a GPS, a satellite-based system, a radio-based system, a radar-based system, an ultrasound-based system, an infrared energy-based system, a portable navigation device, a network-based navigation system, an LAN-based navigation system, a WAN-based system, a triangulation arrangement, or the like. In any case, each of these personal navigation systems 2 would include the necessary electrical components and devices in order to effectively produce the desired positional data. In addition, any of the underlying functions of the presently-invented system, process, and arrangement can be implemented by, or integrated in, the personal navigation system 2.

Example

Figure 17:
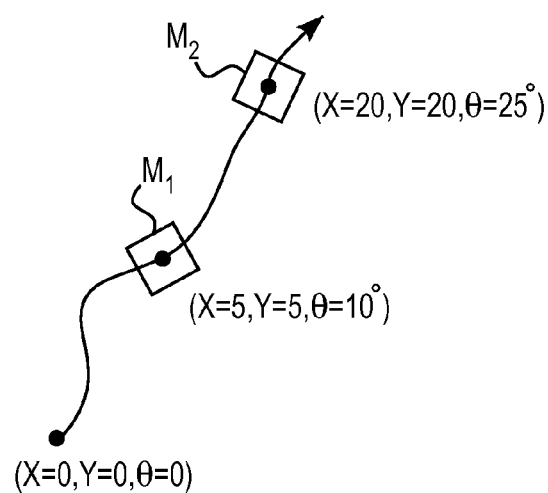
FIG. 17 is a schematic view of a portion of a navigational initialization system and arrangement according to the principles of the present invention.

One example implementation of the initialization system 1 of the present invention is discussed hereinafter with reference to FIG. 17. The navigational state of the user 3 is described by an azimuth angle (i.e., angle about a vertical axis) and a horizontal (x, y) position estimate. Upon power-up of the personal navigation system 2, these values are unknown, and thus, assumed to be zero, i.e., (x=0, y=0, θ=0°). Since the relationship between users 3 is unknown, it is not possible to represent each user 3 on a common coordinate system 9 in any meaningful way. Therefore, and as discussed above, the present invention provides a system and process for placing all users 3 on the same common coordinate system 9.

With reference to the diagram in FIG. 16, the user 3 powers up the personal navigation system 2, the state of which is defined as (x=0, y=0, θ=0°). Next, the user 3 contacts the first reference point arrangement 4 (referred to as marker $M_1$), which in this example, yields the first user data set 5 of ($x_1$=5, $y_1$=5, $\theta_1$=10°). The user 3 then walks to and contacts the second reference point arrangement 6 (referred to as marker $M_2$), which yields the second user data set 7 of ($x_2$=20, $y_2$=20, $\theta_2$=25°).

Next, the vector from first reference point arrangement 4 to the second reference point arrangement 6 is determined as follows:

$$N = M_2 - M_1 = \begin{pmatrix} 20 \\ 20 \end{pmatrix} - \begin{pmatrix} 5 \\ 5 \end{pmatrix} = \begin{pmatrix} 15 \\ 15 \end{pmatrix}$$

It is assumed that the true location of the first reference point arrangement 4 ($M_1$) is $R_1$=(0, 0), and the second reference point arrangement 6 ($M_2$) is $R_2$=(1, 0). The true distance between or position of the first reference point arrangement 4 and the second reference point arrangement 6 is irrelevant, since the common coordinate system 9 is generated and relative, as determined by the presently-invented system and process. Each of the personal navigation systems 2 of each user 3 will "assume" that the first reference point arrangement 4 and the second reference point arrangement 6 are in the same locations, regardless of their true positions. The reference vector (R) is determined as follows:

$$R = R_2 - R_1 = \begin{pmatrix} 1 \\ 0 \end{pmatrix} - \begin{pmatrix} 0 \\ 0 \end{pmatrix} = \begin{pmatrix} 1 \\ 0 \end{pmatrix}$$

Next, the angle between vector N and vector R is determined as follows:

$$\Delta\theta = a\tan2(N_y, N_x) - a\tan2(R_y, R_x)$$
$$= 45° - 0°$$
$$= 45°$$

Vector N is rotated by $\Delta\theta$, and then $R_1$ is added as follows:

$$\overline{N} = \underbrace{\begin{pmatrix} \cos\Delta\Theta & \sin\Delta\Theta \\ -\sin\Delta\Theta & \cos\Delta\Theta \end{pmatrix} \begin{pmatrix} 15 \\ 15 \end{pmatrix}}_{N} + \underbrace{\begin{pmatrix} 0 \\ 0 \end{pmatrix}}_{R_1} = \begin{pmatrix} 21.2 \\ 0 \end{pmatrix}$$

$$\overline{x} = 21.2, \overline{y} = 0$$

Finally, $\Delta\theta$ is added to $\theta_2$ as follows:

$$\theta = \theta + \Delta\theta = 25° + 45° = 70°$$

Based upon this determination, the user 3 is now located at (x, y, θ)=(21.2, 0, 70°) in the common coordinate system 9 (1, 0, 0) that is relative to the first reference point arrangement 4 and the second reference point arrangement 6 and common to all users 3. Of course, this initialization and alignment process may include further determinations and calculations, e.g., three-dimensional, quaternion attitude representation, a Kalman filter, and the like.

In this manner, the presently-invented system, process, and arrangement provides a unique and innovative approach to establishing a common coordinate system 9 across multiple and individual users 3, each with a unique personal navigation system 2. The present invention takes into account all of the internal biases and errors associated with known personal navigation systems, such as an INS (and its individual components), and can be implemented for use in a variety of situations and environments. For example, in one preferable environment, the present invention is particularly useful in establishing the common coordinate system 9 for use in tracking multiple users 3 in an enclosed environment, such as a building or the like. Therefore, the present invention provides a system, process, and arrangement that initializes and sets all users 3 to a common and trackable coordinate system.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:
1. An initialization system for a personal navigation system associated with a user, comprising:
at least one portable structure comprising: (1) an arbitrary first reference point arrangement configured for communication with the personal navigation system of the user and to facilitate the generation of a first user data set including horizontal position and azimuth angle ($x_1$, $y_1$, $\theta_1$); and (2) an arbitrary second reference point arrangement configured for communication with the personal navigation system of the user and to facilitate the generation of a second user data set including horizontal position and azimuth angle ($x_2$, $y_2$, $\theta_2$); and
at least one control device configured to determine a common coordinate system based at least in part upon the first user data set and the second user data set,
wherein the at least one portable structure is configured for placement on the ground and has an upper surface configured for contact with the user.

2. The initialization system of claim 1, wherein the at least one control device is further configured to determine at least one of the following: at least one vector between the first reference point arrangement and the second reference point arrangement; at least one angle between at least two vectors; at least one position; at least one azimuth; at least one heading; or any combination thereof.

3. The initialization system of claim 1, further comprising a plurality of users, each associated with a respective personal navigation system.

4. The initialization system of claim 1, wherein the first reference point arrangement and the second reference point arrangement are formed in spaced positions of the at least one portable structure.

5. The initialization system of claim 4, wherein the at least one portable structure is an elongated mat for placement on the ground and having an upper surface configured for contact with the user.

6. The initialization system of claim 1, wherein the first reference point arrangement comprises a first portable structure, and the second reference point arrangement comprises a second portable structure.

7. The initialization system of claim 6, wherein the first portable structure and the second portable structure are each in the form of a mat for placement on the ground and having an upper surface configured for contact with the user.

8. The initialization system of claim 1, further comprising at least one indicator on an upper surface of the at least one portable structure, wherein the indicator is at least one of the following: a visual marking, an indentation, a boot-shaped visual marking, a boot-shaped indentation, or any combination thereof.

9. The initialization system of claim 1, wherein at least one of the first reference point arrangement and the second reference point arrangement comprise at least one of the following: at least one radio frequency arrangement, at least one magnetic field arrangement, at least one pressure sensing arrangement, at least one acoustic arrangement, at least one electrical arrangement, or any combination thereof.

10. The initialization system of claim 1, wherein at least one of the first reference point arrangement and the second reference point arrangement comprise at least one magnet.

11. The initialization system of claim 1, wherein the at least one control device is further configured to:
   determine the contact position by a user on the first and second reference point arrangements; and
   determine the first and second user data sets, including horizontal position and azimuth, based at least in part upon the determined contact position.

12. The initialization system of claim 1, wherein at least one of the first reference point arrangement, the second reference point arrangement, and the at least one control device is configured to cause at least one indication action to occur that can be sensed by the user upon contact with the first reference point arrangement and the second reference point arrangement.

13. The initialization system of claim 1, wherein the indication action is at least one of the following: audible, visual, tactile, olfactory, or any combination thereof.

14. The initialization system of claim 1, wherein the personal navigation system is an inertial sensor module located on the foot of the user, the inertial sensor module comprising a plurality of inertial sensors and a communication device.

15. The initialization system of claim 1, wherein the at least one control device is an onsite computer capable of communicating with at least one of the following: the first reference point arrangement, the second reference point arrangement, the personal navigation system, or any combination thereof.

16. The initialization system of claim 1, further comprising a personal communication device located on the user and capable of communicating with at least one of the following: the first reference point arrangement, the second reference point arrangement, the at least one control device, the personal navigation system, or any combination thereof.

17. An initialization system for a personal navigation system mounted on a boot of a user, comprising:
   an arbitrary first reference point arrangement in the form of a first portable mat for placement on a surface and having an upper surface, wherein, upon contact by the boot of the user on the upper surface, the first reference point arrangement is configured to: communicate with the personal navigation system of the user; and facilitate the generation of a first user data set including horizontal position and azimuth angle $(x_1, y_1, \theta_1)$;
   an arbitrary second reference point arrangement in the form of a second portable mat for placement on a surface and having an upper surface, wherein, upon contact by the boot of the user on the upper surface, the second reference point arrangement is configured to: communicate with the personal navigation system of the user; and facilitate the generation of a second user data set including horizontal position and azimuth angle $(x_2, y_2, \theta_2)$; and
   at least one control device configured to determine a common coordinate system based at least in part upon the first user data set and the second user data set.

18. The initialization system of claim 17, wherein the at least one control device is further configured to determine at least one of the following: at least one vector between the first reference point arrangement and the second reference point arrangement; at least one angle between at least two vectors; at least one position; at least one azimuth; at least one heading; or any combination thereof.

19. An initialization process for a personal navigation system associated with a user, comprising:
   positioning at least one portable structure on a ground surface, the at least one portable structure comprising an arbitrary first reference point arrangement and an arbitrary second reference point arrangement, wherein the at least one portable structure is configured for placement on the ground and has an upper surface configured for contact with the user;
   upon contact by the user with the arbitrary first reference point arrangement, communicating with the personal navigation system of the user and generating a first user data set including horizontal position and azimuth angle $(x_1, y_1, \theta_1)$;
   upon contact by the user with the arbitrary second reference point arrangement, communicating with the personal navigation system of the user and generating a second user data set including horizontal position and azimuth angle $(x_2, y_2, \theta_2)$; and
   determining a common coordinate system based at least in part upon the first user data set and the second user data set.

* * * * *